United States Patent [19]

Gokcen

[11] 3,870,451
[45] Mar. 11, 1975

[54] APPARATUS FOR EXTRUDING FOAMED THERMOPLASTIC MATERIAL

[75] Inventor: Cem M. Gokcen, Beloit, Wis.

[73] Assignee: Beloit Corporation, Beloit, Wis.

[22] Filed: Apr. 30, 1973

[21] Appl. No.: 355,766

[52] U.S. Cl............ 425/378 R, 425/381, 425/467, 425/817 C
[51] Int. Cl............................................. B29f 3/08
[58] Field of Search........ 425/4 C, 378, 817 C, 380, 425/381, 379, 404, 466, 467, 376, 207, 208, 209, 461

[56] References Cited
UNITED STATES PATENTS
2,653,348  9/1953  Elgin et al........................ 425/208

Primary Examiner—R. Spencer Annear
Assistant Examiner—Mark Rosenbaum
Attorney, Agent, or Firm—Dirk J. Veneman; Bruce L. Samlan; Gerald A. Mathews

[57] ABSTRACT

An apparatus for continuously forming a foamed thermoplastic profile including an extruder having a die attached to the outlet end thereof. A rotatable screw is disposed within the extruder and a mandrel is secured to the downstream end of the screw. The screw extends towards the outlet of the die. The mandrel and die cooperatively define an annular outlet orifice to produce a tubular shaped parison. Adjacent to the annular outlet is a sizing apparatus to properly size and shape the tubular parison.

8 Claims, 11 Drawing Figures

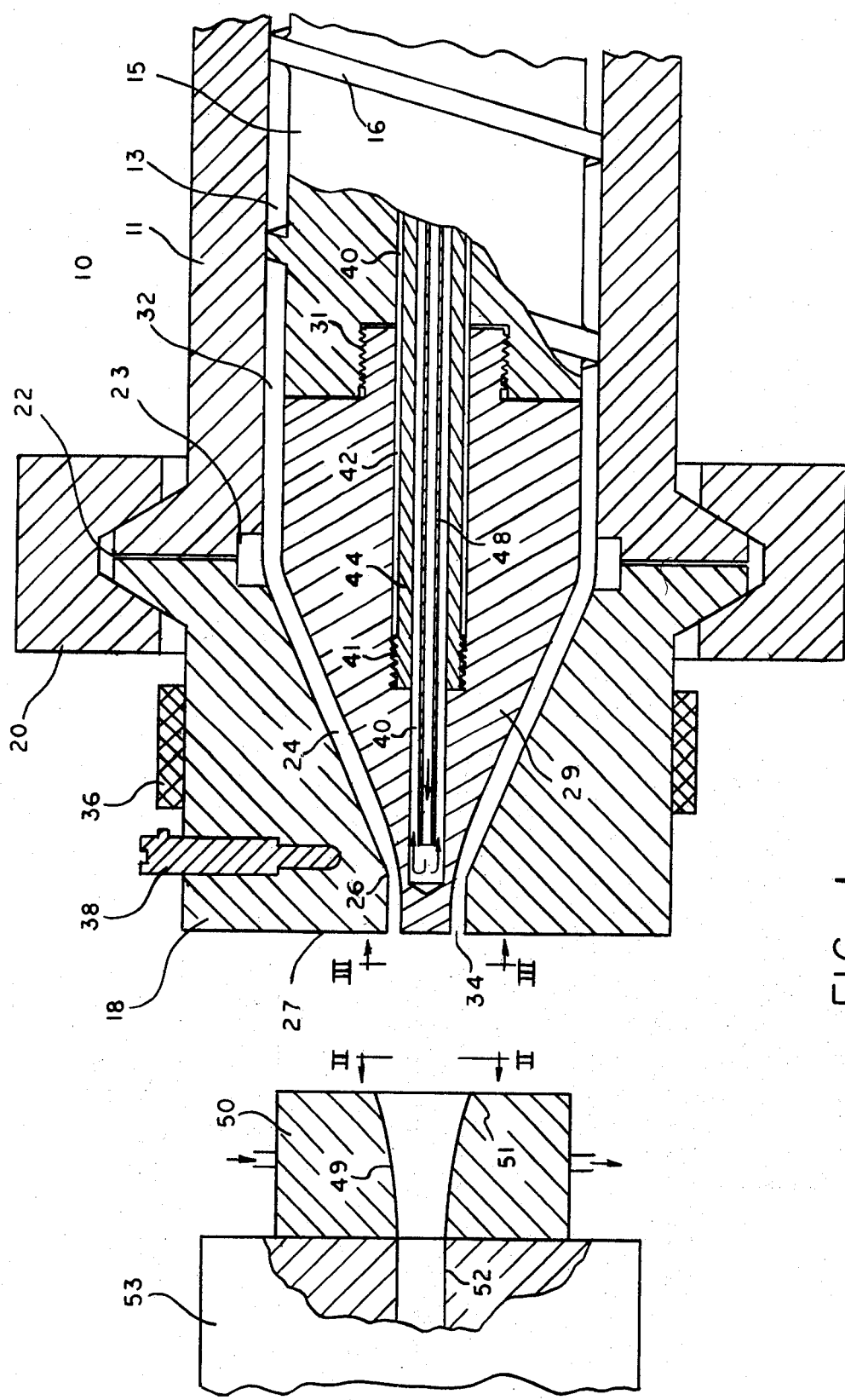
FIG. I

APPARATUS FOR EXTRUDING FOAMED THERMOPLASTIC MATERIAL

BACKGROUND OF THE INVENTION

The following relates to continuously extruding a foamed thermoplastic material into a foamed product, generally referred to as a profile, which has a substantially unfoamed outer core and a foamed inner core.

One known process consists of extruding an expandable thermoplastic material from a rotatable screw. The extrudate passes into the die and over a spider member which supports a stationary mandrel structure. This produces a hollow tubular parison exuding from the outlet of the die structure containing the spider. The plastic then comes in contact with a cold sizing sleeve whereby the outer surface of the foamed material solidifies before substantial foaming occurs and forms a hard outer skin surface. The inner portion foams to fill up within the outer shell and forms a foamed inner core.

This type of foam extrusion produces a multitude of finished shapes commonly known as profiles and can vary in shell smoothness, hardness, and cellular density depending on the various parameters and materials used. The main disadvantages of such a process is that the spider which supports the mandrel, causes "hang up" areas within the flow passages of the thermoplastic material. Contamination occurs and in certain heat sensitive types of material, the spider causes undesirable streaking within the extruded thermoplastic material.

Another disadvantage is that the temperature of the spiders cannot be effectively controlled and, therefore, versatility is lost in controlling the expansion of the foamed materials.

Another disadvantage is that to change from one shape of profile to another, the entire die, spider and mandrel is removed, and a new die, spider, and mandrel is fastened to the extruder. This is time consuming and expensive.

What would be desired then is a foam extrusion method and apparatus to produce foamed thermoplastic profiles or shapes which would eliminate a spider and the hang up areas. It would also be desirable to more adequately control the temperature of the plastic exiting the die. It is also desirable to effectively regulate the amount of foaming which occurs in the final extruded profile. Finally, it is desirable to provide a more versatile foam system to reduce down time and the additional cost of extra dies.

SUMMARY OF THE INVENTION

Apparatus for producing foamed thermoplastic profiles. The apparatus includes an extruder and a die structure attached to the downstream end thereof, the die structure being in fluid communication with the extruder. A screw is rotatably disposed within the extruder to convey and plasticize the melt therein. At the downstream end of the screw, a mandrel structure is threaded into the screw. The mandrel extends from within the downstream end of the extruder to the outlet of the die. The mandrel is generally conically shaped with the smaller diameter portion of the mandrel being in spaced relation with the downstream end of the die to cooperatively define an annular outlet orifice.

A hollow passageway is concentrically disposed within the screw and the mandrel and a pipe structure is disposed with said passageway. The pipe structure is in fluid communication with fluid heating means supplied to the pipe structure.

In operation, plastic material is plasticized and conveyed through the extruder and shaped in the die portion. The plastic material has suitable foaming agents therein. As it passes over the mandrel portion, heat is added to the plasticized melt by the heating fluid in the pipe structure. The plastic exudes from the die structure from the annular outlet orifice in a generally tubular manner. It then enters the sizer where it is shaped and allowed to foam.

Therefore, what is described is a method and apparatus to produce a foamed thermoplastic profile by continuous extrusion, whereby the spider which is presently used in similar techniques has been eliminated. This results in a more efficient extrusion operation and a better quality extruded will result. By supplying the additional heating means, foaming can be more adequately controlled than in conventional techniques. Finally, the same die structure can be used to make differently shaped profiles.

DESCRIPTION OF THE DRAWINGS

FIG. 1 is a longitudinal sectional view showing an extrusion apparatus built in accordance with the principles of the present invention;

DESCRIPTION OF THE PREFERRED EMBODIMENT

Figure 4:
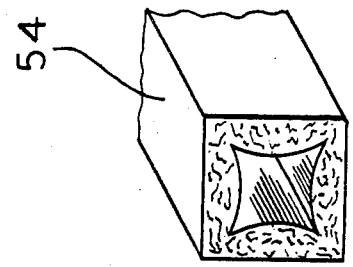
FIG. 4 is an extruded product which can be produced on the above apparatus.

Referring to the drawings in detail and more specifically to FIG. 1, there is shown a portion of an extruder 10. The extruder includes any suitable feeding means (not shown) for supplying plastic melt to the extruder. The extruder includes a cylindrical barrel structure 11 defining a chamber 13 there within. A rotatable screw 15, having generally helical flights 16 extending radially therefrom, is concentrically supported within the chamber 13. The screw 15 is supported within the inner wall of the barrel 11 by the flights 16 as is well known in the art. A die structure 18 is provided at the downstream end of the extruder 10. The die 18 is positioned relative to the extruder 10 by any suitable clamping means 20. The die 18 and the extruder 10 are in closely spaced relation as indicated by the annular clearance 22, said clearance defined by the annular spacer ring 23 positioned between the extruder and die.

A generally conically shaped chamber portion 24 is concentrically defined within the die 18. At its upstream end, the chamber 24 has a diameter substantially equal to the diameter of the chamber 13 in the extruder. The diameter of the chamber 24 thereby substantially decreases until it reaches a point 26, which is very close to its outlet end 27 of the die. The diameter of chamber 24 is then constant from a point 26 to the outlet end 27 of the die 18.

A mandrel 29 is fastened to the downstream end of the screw 15 by screw threads 31 and the upstream portion of the mandrel is within the extruder barrel 11.

The mandrel 29 is generally conically shaped with the upstream portion having the same outer diameter as the end portion of the screw 15. The diameter of the mandrel 29 descreases in a downstream direction towards the outlet end 27 of the die, until it reaches a substantially constant diameter at approximately point 26. The diameter of the mandrel 29 remains constant as it extends to the outlet end 27 of the die.

Figure 3:
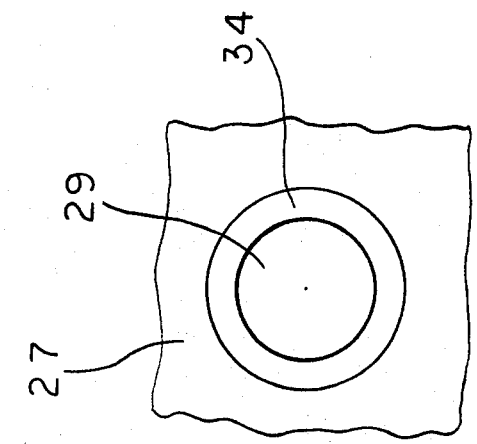
FIG. 3 is a view taken along lines III—III in FIG. 1.

The screw 15, the mandrel 29, the extruder barrel 11, and the die 18 cooperatively define generally toroidal melt flow passageway 32. The passageway extends from the end of the screw flights 16 within the extruder 10 to the die 18. The passageway 32 is of substantially uniform thickness from the downstream end of the screw 15 to the end of the die 18. The mandrel defines in cooperation with the outlet end 27 of the die 18, annular outlet orifice 34 (FIG. 3).

A plurality of heating bands 36 are provided on the periphery of a die 18 to provide external heating to the die structure. A suitable thermocouple device 38 is provided in the die to project downwardly therein for temperature measurement near the outlet orifice 34 of the die.

A cylindrically shaped opening 40 is centrally disposed within the screw 15 and a correspondingly cylindrically shaped opening 42 is disposed within the mandrel 29. At the downstream portion of the mandrel corresponding to the cylindrical opening 42, are threaded portions 41 which receive corresponding threaded portions of a tubular outer conduit structure 44. It will be noted that the conduit structure 44 is in spaced relation with the majority of the wall portion defining the cylindrical opening 42 in the mandrel and is in spaced relation with the cylindrical opening 40 defined by the walls of the screw 15. This provides a heat sink between the conduit structure 44, the screw 15, and most of the mandrel 29.

Disposed downstream of the screw threaded portion 41 is cylindrical opening 46, which extends towards the downstream end of the mandrel 29. A second conduit structure 48 of smaller diameter than the first conduit 44 is disposed within the first conduit 44, although the second conduit may be disposed anywhere there within.

Figure 2:
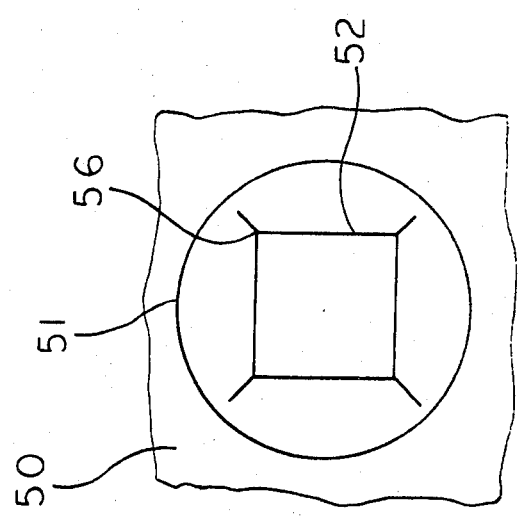
FIG. 2 is a view taken substantially along lines II—II in FIG. 1.

Disposed closely adjacent to the outlet end 27 of the die 18 is a sizing structure 50 which is well known in the art. The sizing structure may provide means for providing cooling fluid to the sizer and for removal of the heated fluid from the sizer. In the embodiment shown, (FIGS. 1 and 2) the sizer includes a transition member 49 having an upstream portion of cylindrical shape 51 that progressively changes in contour to a shape of square cross section 52 at the downstream portion, the downstream portion being disposed in a conventional water tank 53. Any suitable shape may be utilized at the downstream portion of the transition member 49.

In operation, the thermoplastic material and a suitable foaming agent are plasticized and mixed together within the extruder 10 whereby the combination of thermoplastic material and foaming agent are above the foaming temperature and pressure of the foaming agent. The material is then conveyed through melt flow passageway 32 towards the annular outlet orifice 34. Heating fluid from a source not shown enters the inner conduit 48 and flows thereto to the cylindrical opening 46 in the downstream portion of the mandrel 29. The fluid returns through outer conduit 44 maintaining an accurate and continuous supply of heating of cooling fluid into the downstream portion of the mandrel.

It has unexpectedly been found that by utilizing the combination of a screw with a mandrel attached thereto, means are now provided for controlling the temperature of the parison formed within the die 18 and more specifically, the temperature of the inner wall thereof. By doing so, the degree of expansion towards the center can be much more accurately controlled than any other prior known method. It will further be observed that the outer conduit 44 is in spaced relation with the screw and the upstream portion of the mandrel 29. This heat sink minimizes the effect of the heating fluid on either the screw 15 or the upstream portion of the mandrel 29.

It is also observed that the strip heaters 36 encompassing the die may be utilized in certain applications to control the temperature of the parison formed within the die as to the outer periphery thereof to help control expansion in a radially outer direction, as well as the more normal use of heaters 36 for heating the die during start-up conditions.

As the parison exits the outlet orifice 34 of the die 18, it enters the sizing structure 50 closely spaced thereto. It will be noted in the embodiment shown, that the tubular parison exiting the die enters a substantially square cross section 52 of the sizer 50. It has been unexpectedly found that the tubular parison is transformed into a profile 54 being of square cross section (FIG. 4) because the radially outward expansion filling the corners 56 (FIG. 2) of the sizing opening 52 is controlled by the amount of foaming, which in turn is partially affected by the heaters 36. On the other hand, the degree of foaming towards the center of the profile 54 is controlled to great extent by the heating fluid supplied by the inner and outer conduits 48 and 44 respectively. It has been found that by lowering the effective temperature of the parison exiting from the orifice 34, the outer surface of the profile 54 is much more grainy and has a better wood-like appearance. Correspondingly by increasing the temperature, the profile results in a much smoother surface finish. Surface finish can also be regulated by the temperature of the fluid within the sizer 50.

It can readily be seen that there are many advantages to this type of foam extrusion system. For instance, the spider is completely eliminated which is a major disadvantage of prior art systems. The single die in an extrusion orifice can be utilized whereas in the prior art structures, different dies were utilized for different shaped articles. The heating means control the degree of foaming towards the center of the profile and/or towards the outside of the profile. Finally, the overall system has substantially reduced costs compared to presently available apparatus and methods.

Although only one embodiment has been shown, it will be obvious to those skilled in the art that various embodiments can be made without departing from the spirit and scope of the invention thereof, and it is intended that all subject matter contained in the foregoing description and shown in the accompanying drawings shall be interpreted as illustrative and not in a limiting sense.

What is claimed is:

1. A structure for producing a foamed thermoplastic product comprising an extruder, a die structure attached to the outlet end of said extruder and in fluid communication therewith, a plasticizing screw rotatably disposed within said extruder, the improvement comprising:

a mandrel secured to the downstream end of said screw to rotate therewith, said mandrel extending into and to the outlet end of said die structure and cooperating therewith to form an outlet orifice, said screw and mandrel defining a generally toroidal shaped melt flow passageway of substantially uniform thickness from the downstream end of the screw to the outlet of the die structure and having at least a portion of decreasing cross-sectional area.

2. The structure recited in claim 1 wherein the outlet orifice is annularly shaped.

3. The structure recited in claim 1 wherein the mandrel is detachably secured to the screw and is attached to the screw within the extruder.

4. The structure recited in claim 1 and further including a sizing member, said sizing member being closely spaced adjacent to the outlet orifice.

5. The structure recited in claim 4 wherein any foamed thermoplastic material leaving the outlet orifice is of tubular shape and is converted to a different polygonal shape within the sizing member.

6. The structure recited in claim 1 wherein said screw has an opening disposed therein and said mandrel has a corresponding opening disposed therein in fluid communication with said screw opening, and means to heat and cool said openings to regulate the temperature of the downstream portion of the mandrel.

7. The structure recited in claim 6 wherein the heating and cooling means comprise an outer conduit disposed in said openings, and an inner conduit disposed within said outer conduit, and means supplying heating and cooling fluid to one of said conduits and returning the fluid in the other said conduits.

8. The structure recited in claim 6 and further including means to insulate the heating and cooling means from the screw and upstream portions of the mandrel.

* * * * *